Figure 1:
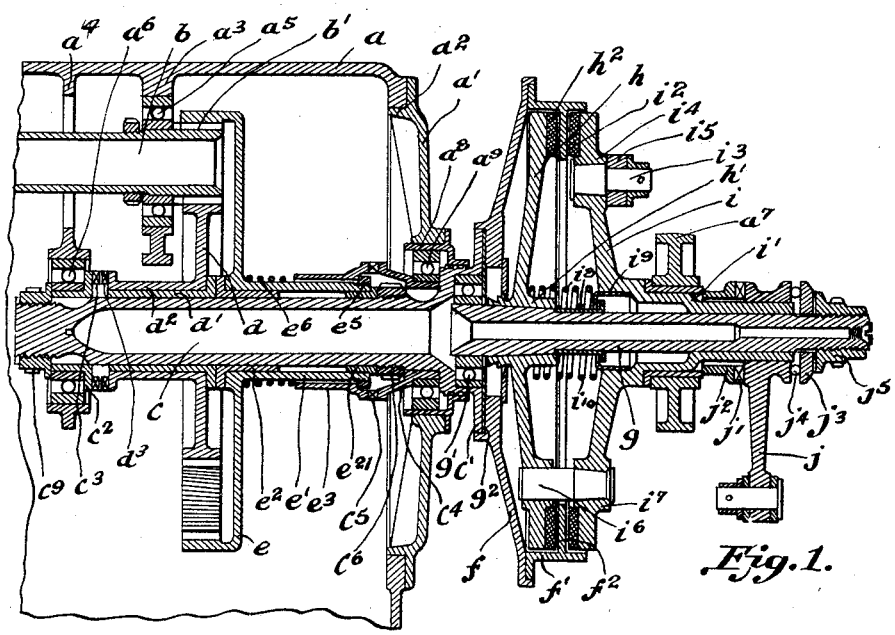

Oct. 8, 1929.   F. H. ROYCE   1,731,178
BRAKE FOR VEHICLES
Filed Feb. 17, 1925

Inventor
Frederick Henry Royce
By Mason Fenwick Lawrence
Attorneys

Patented Oct. 8, 1929

1,731,178

UNITED STATES PATENT OFFICE

FREDERICK HENRY ROYCE, OF WEST WITTERING, NEAR CHICHESTER, ENGLAND, ASSIGNOR TO ROLLS-ROYCE LIMITED, OF NIGHTINGALE ROAD, DERBY, ENGLAND

BRAKE FOR VEHICLES

Application filed February 17, 1925, Serial No. 9,886, and in Great Britain March 17, 1924.

This invention has reference to a brake system for vehicles of the type commonly known as a servo system. In most or all of the brake systems of the said type the servo is not available to brake the vehicle for backward movement. The object of the invention is to make a brake system of the kind referred to which is available for backward and forward movement. A further object is to reduce lag in the application of the brakes and a further object is to secure a quicker application in backward movement.

I make a brake system in which there are two concentric shafts carrying respectively the driving and driven members of a friction clutch the shaft carrying the driving member (hereinafter called "the driving shaft") being geared (preferably through a speed reducing device) to road wheels and therefore constantly rotating when the car is moving and the shaft carrying the driven member (hereinafter called "the rocking shaft") being geared to the brakes with means whereby the driver can, with one operation, put on the brakes and close the clutch, and bring the torque of the driving member (the clutch always slipping) to aid the pressure or force exerted by himself, and in the gearing or transmission between the driving member of the clutch and the road wheels, and at a suitable place, is interposed a mechanism whereby the rotative movement of a shaft, whether in one direction or the other, transmits a rotative movement in one direction only.

One form of apparatus made according to my invention is as follows:—

The driving member of the clutch, preferably in the form of a shallow drum concentric with the shaft, carries within it an annular concentrically located plate (hereinafter called "the rotating plate") the rocking shaft is capable of a certain axial movement and there is mounted thereon a sleeve (hereinafter called "the clutch sleeve") engaging therewith by axial serrations so that such sleeve can slide thereon axially but is rigid therewith rotatively and there is mounted on the clutch sleeve another sleeve (hereinafter called the "pedal sleeve") engaging therewith by means of spiral serrations, and located axially in relation to the driven or rocking shaft by means of a collar fixed on such shaft with end thrust ball bearings interposed, there is concentrically mounted on each of the members, to wit, the rocking shaft and the clutch sleeve, a plate (hereinafter called "friction plates") carrying friction surfaces, one of such plates being on one side and the other on the other side of the rotating plate, so that if the clutch sleeve and the rocking shaft are caused to move axially relatively and the two friction plates to close in, they make frictional contact with the rotating plate.

From the pedal sleeve is projected a lever operable by the driver, and from the clutch sleeve or from the rocking shaft or some other shaft or member geared thereto there is projected a lever in operative connection with the brakes.

One form of mechanism to transmit rotative motion in either direction into rotative motion always in the same direction is as follows: A pinion rigidly mounted on a shaft engages another pinion and also an internally toothed annulus both the second mentioned pinion and the annulus being mounted concentrically with another shaft, and both engaging such other shaft by a one way driving device, so that either the annulus is driving such other shaft and the pinion is running free in the reverse direction or vice versa.

With apparatus constructed as above described the operation of the pedal lever will, with one and the same operation by the driver, put on the brakes and also close the clutch whereupon a torque will be communicated from the driving shaft to the driven shaft (the clutch always slipping) and aid the driver in applying the brakes, and this will be equally effective both for backward and forward movement and there will be very little lag and it can be arranged to be quicker in action for the backward movement than for the forward and thus further reduce lag in the backward movement.

In the accompanying drawings is shown an example of my invention the mechanism for converting rotation of a member in either direction into rotation of a member in one direction only being on the driving side of the clutch.

Figure 2:
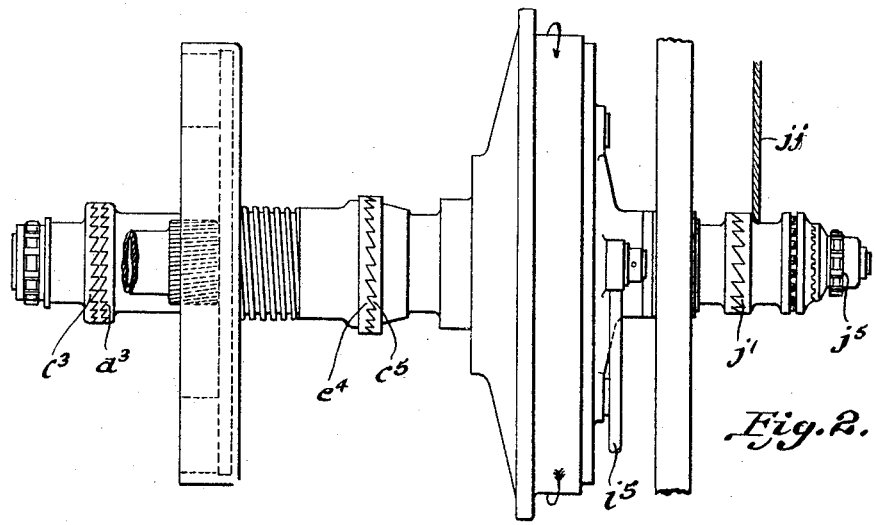

Fig. 1 is a sectional elevation and Fig. 2 a plan view of Fig. 1. $a$ is the gear box casing, $a^1$ is a cover or end piece spigoted into an opening therein at $a^2$, $a^3$ and $a^4$ are ribs or webs extended from the casing $a$ to support the ball bearings $a^5$ and $a^6$ of the shafts hereinafter described and $a^7$ is a member secured to the gear box supporting mechanism hereinafter described. The cover $a^1$ has an annular boss in which is fitted the annular member $a^8$ which holds the outer race of ball bearings $a^9$. $b$ is a shaft supported by ball bearings $a^5$ geared to a transmission shaft permanently geared to the road wheels, and hence is always rotating in one direction or the other when the vehicle is moving, $b^1$ is a pinion fixed on or formed on shaft $b$ with spiral teeth or serrations. $c$ is a shaft supported by bearings $a^6$ and $a^9$ terminating in a flange $c^1$, $c^2$ is a flanged bush secured to the shaft $c$ carrying the inner race of bearings $a^6$ and having formed thereon sawteeth $c^3$, $c^4$ is an annular member also secured to the shaft $c$ and having saw teeth $c^5$ formed thereon, $c^6$ is a nut engaging a thread formed on a part of the shaft $c$ having a slightly larger diameter to locate the annular member $c^4$, and $c^9$ is a flanged nut engaging a thread on the shaft $c$ locating the inner race of ball bearings $a^6$, and also the sleeve $c^2$. $d$ is a pinion with a flanged bearing bush $d^1$ making a tight fit therein freely mounted on shaft $c$ with an extended hub $d^2$ terminating in a flange on which are formed saw teeth $d^3$, which engage with the saw teeth $c^3$. The pinion $d$ has spiral or single-helical teeth and is permanently in mesh with the pinion $b^1$. $e$ is an annulus gear with an extended hub $e^1$ with the flanged bearing bushes $e^2$ and $e^{21}$ making a tight fit therein freely mounted on the shaft $c$ provided with single-helical teeth in permanent mesh with the pinion $b^1$. $e^3$ is a sleeve with internal axial serrations engaging external axial serrations on the hub $e^1$ and on which are formed saw-teeth $e^4$ engaging the saw teeth $c^5$, $c^5$ is a nut engaging threads formed on the hub $e^1$ limiting the axial movement of the sleeve $e^3$ relatively to the hub. $e^6$ is a spiral spring reacting between the annulus $e$ and the sleeve $e^3$ and holding the latter normally against the nut $e^5$. It will be observed that the pinions $d$ and $e$ are always moving in opposite directions that is to say, if the shaft $b$ is rotating in one direction, one of the pinions will (if viewed say, from the left) be moving clockwise and the other anti-clockwise, and if the shaft $b$ is rotating in the reverse direction the pinion $d$ or $e$ which was rotating clockwise will be moving anti-clockwise and the other one clockwise. The teeth $c^3$ and $d^3$ are inclined so that they engage when the pinion $d$ (viewed from the left) is rotating clockwise, and automatically disengage (moving the pinion to the right) when that pinion is rotating anti-clockwise, while the teeth $e^4$ and $c^5$ are inclined so that they engage when the pinion $e$ (viewed from the left) is rotating clockwise, and automatically disengage (moving the pinions to the left) when that pinion moves anti-clockwise. The distance apart of the teeth $d^3$ and $e^4$ is such that when one set of engaging teeth are in full engagement the others are just free from one another. The axial movement of the pinions $d$ and $e$ is brought about automatically by the engaging teeth $d^3$ and $e^4$ but it is also brought about by the spiral formation of the teeth of the pinions $b^1$, $d$ and $e$. The result of the mechanism so far described is that no matter which way the shaft $b$ rotates (or in other words no matter in which direction, forwards or backwards, the vehicle is travelling) the shaft $c$ will always rotate in the same direction. $f$ is an annular flange secured to the flange $c^1$ and $f^1$ an annular member secured to the member $f$, the part $f^2$ forming an annular plate which is always rotating when the vehicle is moving. $g$ is a rocking shaft supported at one end in ball bearings $g^1$, (the outer race of which is supported by the shaft $c$, and located axially by the annular plate $g^2$) and taking bearing in the member $a^7$, $h$ is a flange extended from the hub $h^1$ which is secured to the shaft $g$, $h^2$ is an annular friction disc, $i$ is a flange extended from the two diameter sleeve $i^1$ freely mounted on the shaft $g$, $i^2$ is an annular friction disc secured to the flange $i$, $i^3$ is a pivot riveted in a hole formed through a boss $i^4$ on the flange $i$, to which a connecting rod $i^5$ (operably connected to the brakes) is attached. A number of pins $i^6$ are riveted through holes in bosses $i^7$ formed on the flange $i$, and slidably fit like holes in bosses formed on the flange $h$ to secure synchronous rotating movement of the two flanges $h$ and $i$, $i^8$ is a flanged sleeve secured to the shaft $g$ by being formed a tight fit thereon and pressed in position $i^9$ is an annular member with an inward flange secured to the flange $i$ by sweating, the flanges of members $i^8$ and $i^9$ act respectively, as an oil thrower and oil catcher, to prevent oil reaching the friction discs and $i^{10}$ is a spiral spring to keep the two flanges $h$ and $i$ normally away from the plate $f^2$, $j$ is a lever operatively connected by the cable $jj$ to the pedal lever actuated by the driver mounted freely on the hub $i^1$ with saw teeth $j^1$ formed thereon, which engage with like teeth on sleeve $j^2$ also mounted on hub $i^1$ and with internal axial serrations which engage axial serrations on the hub. $j^3$ is a washer constituting the ball race for the thrust ball bearing $j^4$ and $j^5$ is a nut. The washer $j^3$ is fixed to the shaft $g$ for rotation being provided with internal axial serrations which engage axial serrations on the shaft, and the contiguous faces of the washer $j^3$ and nut $j^5$ are provided with corresponding engaging teeth of a depth equal to the minimum desirable axial clearance between the revolving plate on the one hand and the friction discs on the other. By this arrangement when it is required to adjust the clearances between the revolving plate and the friction discs the correct adjustment can be readily secured. The adjustment is effected by screwing the nut up to such a point that when the engaging teeth are just clearing there is no servo clearance and then unscrewing the nut until the teeth fully engage.

The flange $c^1$ and the members $f$, $f^1$ and $f^2$ constitute one side of a disc clutch; while the flanges $h$ and $i$, with the elements for mounting them on the rocking shaft $g$, constitute the other side of the said clutch.

The mechanism functions as follows:—

When the lever $j$ is operated the engaging saw teeth $j^1$ cause the hub of the lever and the sleeve $j^2$ to separate axially the former causing the shaft $g$ and with it the flange $h$ to move to the right, and the latter the hub $i^1$ and the flange $i$ to the left, relatively to one another. Thereupon the two friction discs $h^2$ and $i^2$ close towards one another and make frictional engagement with the constantly rotating plate $f^2$, thereby communicating the torque of the shaft $c$ to the flanges $h$ and $i$ and so pushing the connecting rod $i^5$ which is in operative connection with the brakes. Apart from that functioning, directly the friction discs are in contact with the rotating plate the relative axial movement of the lever $j$ and sleeve $j^2$ is arrested, and thereupon if the vehicle is moving slowly or is stationary the lever carries with it, in a rotating movement the mechanism including the flanges $h$ and $i$, the plate $f^2$, and the shaft $c$ (the last moving in advance of the speed communicated to it by the shaft $b$) until the movement is arrested by the brakes coming in contact with the wheel drums. In doing this the rotation of the shaft $c$ in advance of the speed communicated by the road wheels, will throw out both sets of engaging teeth to wit, $c^3$, $d^3$ and $e^4$, $c^5$ and to enable this to take place the member $e^3$ moves axially against the reaction of the spring $e^6$.

If the mechanism for transmitting the rotative motion in either direction into rotative motion in one direction, were on the driven side of the clutch it would be necessary to introduce some additional device on the brake side of such mechanism whereby the brakes are released on the pedal lever being released.

What I claim is:—

1. A brake system for wheeled vehicles in which the moving of the vehicle aids the driver in applying pressure to the brakes comprising a rotating shaft geared to the road wheels of the vehicle, a pinion rigidly mounted thereon, a second rotating shaft with axis parallel to that of the first mentioned shaft, a pinion and an annulus with internal teeth each mounted on the second rotating shaft with their bosses abutting against one another, a one-way drive mechanism securing each said pinion and said annulus to said shaft, said pinion and annulus each engaging the pinion on the first mentioned shaft, a rocking shaft co-axial with the second mentioned shaft, a friction disc clutch one side of which is mounted on the second mentioned shaft and the other side of which is operably connected to the brakes and is mounted on the rocking shaft, means operable by the driver for engaging and disengaging the two sides of the friction clutch, whereby whether the vehicle is traveling forwards or backwards, the second mentioned shaft always rotates the same way so that the torque of such shaft is, when the clutch is engaged, communicated, the clutch always slipping, to the said other side and the brakes are thereby actuated.

2. A brake system for wheeled vehicles in which the moving of the vehicle aids the driver in applying pressure to the brakes, comprising a rotating shaft geared to the road wheels, a pinion rigidly mounted thereon, a second rotating shaft with axis parallel to that of the first mentioned shaft, a pinion and an annulus with internal teeth each loosely mounted on the second mentioned rotating shaft and each engaging the pinion on the first mentioned shaft with their bosses abutting against one another, the outer faces of the bosses of each being provided with similarly inclined saw teeth, two members mounted on and rigidly secured to the second mentioned rotating shaft, one on each side of the pinion and annulus, the faces of said members presented to the outer faces of the said bosses respectively provided with corresponding saw-teeth, the said members being spaced apart so that the pinion and annulus being moved in the same direction axially and the boss of one of them abutting against one of the members and the teeth on the boss so abutting engaging the teeth of such member, the teeth on the boss of the other of them will be just free from the teeth of the other member, a rocking shaft co-axial with that of the second mentioned shaft, a friction disc clutch of which one side is mounted on the second mentioned shaft and the other side is operably connected to the brakes and is mounted on the rocking shaft, and means operable by the driver for engaging and disengaging the two sides of the friction clutch, whereby whether the vehicle is traveling forwards or backwards either the pinion or annulus on the second mentioned shaft engages with, while the other disengages from, a member fixed to the second rotating shaft and such shaft always rotates the same way, and the torque thereof is, when the clutch is engaged, communicated, the clutch always slipping, to the said other side which actuates the brakes.

3. A brake system for wheeled vehicles in which the moving of the vehicle aids the driver in applying pressure to the brakes comprising a rotating shaft geared to the road wheels, a pinion rigidly mounted thereon a second rotating shaft with axis parallel to that of the first mentioned shaft, a pinion and an annulus with internal teeth, each loosely mounted with their bosses abutting against one another on the second mentioned rotating shaft, the outer faces of the bosses of each being provided with similarly inclined sawteeth, two members mounted on and rigidly secured to the second mentioned rotating shaft, one on each side of the pinion and annulus, the faces of said members presented to the outer faces of the said bosses respectively provided with corresponding sawteeth, the said members being spaced apart so that the pinion and annulus being moved in the same direction axially and the boss of one of them abutting against one of the members, and the teeth on the boss so abutting engaging the teeth of the member against which it is abutting, the teeth of the boss of the other of them will be just free from the teeth of the other member, the teeth of the pinions and annulus being of single helical formation inclined to urge the pinion and annulus on the second mentioned shaft axially consistently with the action of the sawteeth, a rocking shaft co-axial with that of the second mentioned shaft, a friction disc clutch of which one side is mounted on the second mentioned shaft and the other side of which is operably connected to the brakes and is mounted on the rocking shaft, and means operable by the driver for engaging and disengaging the two sides of the friction clutch, whereby whether the vehicle is traveling forwards or backwards either the pinion or annulus on the second mentioned shaft engages with, while the other disengages from, the secondly mentioned shaft, and such shaft always rotates the same way, and the torque of such shaft is, when the clutch is engaged, communicated, the clutch always slipping to the said other side which actuates the brakes.

4. A brake system for wheeled vehicles in which the moving of the vehicle aids the driver in applying pressure to the brakes, comprising a rotating shaft geared to the road wheels, a pinion rigidly mounted thereon, a second rotating shaft with axis parallel to that of the first mentioned shaft, a pinion and an annulus with internal teeth, each mounted with their bosses abutting against one another on the secondly mentioned rotating shaft, a one way drive securing each said pinion and annulus to said shaft, both drive mechanisms operating in the same direction, and both engaging the pinion on the first mentioned shaft, a rocking shaft co-axial with that of the second mentioned shaft, a friction disc clutch consisting of an annular plate fixed to the second mentioned shaft, a flange projected from the rocking shaft provided with an annular friction disc located on one side of, and normally not in contact with the annular plate, a sleeve loosely mounted on the rocking shaft having a flange provided with an annular friction disc located on the other side of, but normally not in contact with, the annular plate, a rod connecting the last named flange operably to the brakes and means operable by the driver for moving the rocking shaft and sleeve axially relatively to cause the friction discs to make contact with the plate.

5. A brake system for wheeled vehicles in which the moving of the vehicle aids the driver in applying pressure to the brakes comprising a rotating shaft geared to the road wheels, a pinion rigidly mounted thereon, a second rotating shaft with axis parallel to that of the first mentioned shaft, a pinion and an annulus with internal teeth, mounted with their bosses abutting against one another on the second mentioned rocking shaft, a one way drive securing each said pinion and said annulus to said shaft, both drive mechanisms operating in the same direction, and both engaging the pinion on the first mentioned shaft, a rocking shaft co-axial with that of the second mentioned shaft, a friction disc clutch consisting of an annular plate fixed to the second mentioned shaft, a flange on the rocking shaft provided with an annular friction disc located on one side of, and normally not in contact with, the annular plate, a sleeve loosely mounted on the rocking shaft having a flange provided with an annular friction disc located on the other side of but normally not in contact with the annular plate, a rod connecting the last named flange operably to the brakes, a collar fixed to rotate with said rock shaft at the end of said sleeve, a member fixed to said sleeve and having saw teeth extending toward said collar, a lever having a hub rotatable on said sleeve between said member and said collar, one side of said hub having saw teeth engaging the saw teeth on said member and the other side of said hub abutting against said collar, the saw teeth being inclined to cause separation of the hub and member axially when the lever is rotated in one direction, and thereby move said sleeve axially on said rocking shaft to cause said friction disks to contact with the plates.

6. A brake system for wheeled vehicles in which the moving of the vehicle aids the driver in applying pressure to the brakes to that of the first mentioned shaft, a pinion and an annulus with internal teeth, each mounted with their bosses abutting against one another on the second mentioned rotating shaft, and each secured thereto for rotation by a one way drive, the driving mechanisms operating in the same direction, and both said pinion and annulus engaging the pinion on the first mentioned shaft, a rocking shaft coaxial with that of the secondly mentioned shaft, a friction disc clutch consisting of an annular plate fixed to the secondly mentioned shaft, a flange projected from the rocking shaft provided with an annular friction disc located on one side of, and normally not in contact with, the annular plate, a sleeve loosely mounted on the rocking shaft and having a flange provided with an annular friction disc located on the other side of, but normally not in contact, with the annular plate, a rod connecting the last named flange operably to the brakes, a collar fixed at the end of said sleeve to slide axially on and rotate with said rocking shaft, a member fixed to said sleeve and having saw teeth extending toward said collar, a lever having a hub rotatable on said sleeve between said member and said collar, one side of said hub having saw teeth engaging the teeth on said member and the other side abutting against said collar, the teeth being inclined to cause separation of the hub and member axially when the last named lever is rotated in one direction and thereby move said sleeve axially on said rocking shaft to cause said friction disks to contact with the plate, and a nut on the end of said rock shaft and in contact with said collar, the contacting faces of said nut and collar being provided with intermeshing serrations equal in depth to the desired minimum clearance between the plate and disks of said clutch.

7. A brake system as claimed in claim 2 the saw teeth on the face of the boss of the annulus being on a member axially slidable on the boss of such annulus, a stop on the boss and a spiral spring reacting between the said slidable member and a part of the annulus, holding it normally against the stop on the said boss.

8. A brake system for wheeled vehicles in which the moving of the vehicle aids the driver in applying pressure to the brakes and comprising a rotating shaft geared to the road wheels of the vehicle, a counter shaft, means connecting said rotating shaft to said counter shaft to rotate the latter in one direction only, a rocking shaft axially alined with said counter shaft, a clutch element fixed to said counter shaft, and means on said rockroad wheels, a pinion rigidly mounted thereon, a second rotating shaft with axis parallel comprising a rotating shaft geared to the ing shaft operably connected to the brakes and engageable with said element only when the brakes are applied to apply pressure derived from said road wheels to said brakes.

In witness whereof I have signed this specification.

FREDERICK HENRY ROYCE.